(12) United States Patent
Nochi et al.

(10) Patent No.: US 11,376,566 B2
(45) Date of Patent: Jul. 5, 2022

(54) CATALYST AND METHOD FOR REMOVING NOX FROM COMBUSTION EXHAUST GAS

(71) Applicant: MITSUBISHI HITACHI POWER SYSTEMS, LTD., Yokohama (JP)

(72) Inventors: Katsumi Nochi, Yokohama (JP); Koji Higashino, Yokohama (JP); Tomotsugu Masuda, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 262 days.

(21) Appl. No.: 16/469,885

(22) PCT Filed: Dec. 13, 2017

(86) PCT No.: PCT/JP2017/044753
§ 371 (c)(1),
(2) Date: Jun. 14, 2019

(87) PCT Pub. No.: WO2018/110604
PCT Pub. Date: Jun. 21, 2018

(65) Prior Publication Data
US 2019/0314789 A1 Oct. 17, 2019

(30) Foreign Application Priority Data
Dec. 15, 2016 (JP) .............................. JP2016-243167

(51) Int. Cl.
*B01J 23/30* (2006.01)
*B01D 53/86* (2006.01)
(Continued)

(52) U.S. Cl.
CPC .......... *B01J 23/30* (2013.01); *B01D 53/8628* (2013.01); *B01D 53/90* (2013.01); *B01J 35/1061* (2013.01);
(Continued)

(58) Field of Classification Search
None
See application file for complete search history.

(56) References Cited

U.S. PATENT DOCUMENTS

| 4,435,278 A | 3/1984 | Chen |
| 4,946,661 A | 8/1990 | Tachi et al. |
| 2005/0255021 A1 | 11/2005 | DiFrancesco et al. |

FOREIGN PATENT DOCUMENTS

| CN | 105531026 A | 4/2016 |
| GB | 1029461 A | 5/1966 |

(Continued)

OTHER PUBLICATIONS

Takahiro et al, JP H01130720, English Machine Translation from WIPO Translate (Year: 1989).*

(Continued)

*Primary Examiner* — Colin W. Slifka
(74) *Attorney, Agent, or Firm* — WHDA, LLP

(57) ABSTRACT

Provided is a catalyst for removing NOx from a combustion exhaust gas, in particular, a low-NOx combustion exhaust gas, wherein the catalyst has a ratio of a pore volume in a range of not less than 500 Å and not more than 3000 Å in a pore diameter relative to a total pore volume of not less than 15% and not more than 40% and preferably a ratio of a pore volume in a range of not less than 1000 Å in the pore diameter relative to the total pore volume of not less than 10% and not more than 45% in a pore volume distribution in a range of not more than $10^5$ Å in the pore diameter, and where SILICA is unlikely to be deposited and even when the amount of SILICA deposited is increased, denitration performance is hardly lowered.

13 Claims, 9 Drawing Sheets

(51) Int. Cl.
    *B01D 53/90*     (2006.01)
    *B01J 35/10*     (2006.01)
    *F01N 3/10*     (2006.01)

(52) U.S. Cl.
    CPC ............ *B01J 35/1066* (2013.01); *F01N 3/10* (2013.01); *B01J 2523/47* (2013.01); *B01J 2523/55* (2013.01); *B01J 2523/68* (2013.01); *B01J 2523/69* (2013.01)

(56) References Cited

FOREIGN PATENT DOCUMENTS

| | | | |
|---|---|---|---|
| JP | 63-147547 | A | 6/1988 |
| JP | 1-130720 | A | 5/1989 |
| JP | 5-66175 | B2 | 9/1993 |
| JP | H09-253499 | A | 9/1997 |
| JP | 10-323570 | A | 12/1998 |
| JP | 2009-219980 | A | 10/2009 |
| JP | 2011-207749 | A | 10/2011 |
| WO | 2017/170425 | A1 | 10/2017 |

OTHER PUBLICATIONS

International Search Report dated Mar. 6, 2018, issued in counterpart International Application No. PCT/JP2017/044753 (2 pages).
Extended Search Report dated Jul. 17, 2020, issued in counterpart EP Application No. 17880629.5 (4 pages).

* cited by examiner

A ratio of the pore volume in a range of pore diameter of not less than 500 Å and not more than 3000 Å relative to the total pore volume / %

A ratio of the pore volume in a range of pore diameter of not less than 500 Å relative to the total pore volume / %

CATALYST AND METHOD FOR REMOVING NOX FROM COMBUSTION EXHAUST GAS

TECHNICAL FIELD

The present invention relates to a catalyst and a method for removing NOx from a combustion exhaust gas. More specifically, the present invention relates to a catalyst and a method for removing NOx from a combustion exhaust gas, preferably a low-NOx combustion exhaust gas, in which SILICA is unlikely to be deposited and in which even when the amount of SILICA deposited is increased, denitration performance is hardly lowered.

BACKGROUND ART

NOx generated by the combustion of fuels such as coal and biomass is broadly divided into fuel NOx resulting from oxidation of a nitrogen component in the fuel and thermal NOx resulting from oxidation of nitrogen in air. As a combustion method (low-NOx combustion method) for reducing NOx contained in a combustion exhaust gas, known are a low air ratio combustion method, an air multistage combustion method, a fuel multistage combustion method, an exhaust gas recirculation combustion method, a lean premixed combustion method and the like. A low-NOx combustion exhaust gas has a content of NOx being low as compared with a normal combustion exhaust gas, even so, denitration processing is preferably performed for reducing an environmental load.

As a conventional denitration catalyst, for example, Patent Literature 1 discloses an ammonia catalytic reduction denitration catalyst comprising oxides of titanium and molybdenum, having a first pore group having an average diameter in a range of about $1 \times 10^3$ to $1 \times 10^4$ Å and a second pore group having an average diameter in a range of about $10^2$ to $10^3$ Å, wherein the first pore group falls within a range of 10 to 50% of a total pore volume.

Patent Literature 2 discloses a denitration catalyst for reducing and detoxifying a nitrogen oxide in an exhaust gas, comprising titanium oxide as the main component, and having a total pore volume of 0.20 to 0.45 ml/g and a pore volume occupied by pores whose diameters are not less than 1000 Å of 0.05 to 0.2 ml/g.

Patent Literature 3 discloses an ammonia catalytic reduction denitration catalyst which is formed by carrying denitration active components on titanium oxide, having an average pore diameter of not more than 10000 Å, and a ratio of a volume occupied by pores whose pore diameters are 400 to 5000 Å relative to a total pore volume of not less than 50%.

Patent Literature 4 discloses a nitrogen oxide removal catalyst characterized in that a denitration catalyst component is carried on a carrier that a titania sol is impregnated in and carried on a macropore having a size of 100 to 10000 nm, wherein the macropore is formed by secondary aggregation of a mesoporous silica having mesopores having an average pore diameter of not more than 5 nm, and the titania sol has a particle diameter larger than a diameter of the mesopores.

However, when denitration processing on a low-NOx combustion exhaust gas is performed with the conventional denitration catalyst as described above, it is likely that SILICA (here, the meaning of the "SILICA" includes all the states of Si, and the same is true in the following description) is adhered and deposited on the surface of the catalyst, which facilitates deterioration of the denitration catalyst. It is considered that this deterioration may be caused by the fact that Si contained in coal and the like is not sufficiently oxidized in low-NOx combustion and that a large amount of gaseous SILICA such as siloxanes is contained in the combustion exhaust gas.

CITATION LIST

Patent Literatures

Patent Literature 1: JP H05-66175 A
Patent Literature 2: JP S63-147547 A
Patent Literature 3: JP H01-130720 A
Patent Literature 4: JP 2009-219980 A

Non-Patent Literatures

Non-patent Literature 1: Matsumoto et al., "Development of Ultra-low-NOx Coal Fired M-PM Burner", Mitsubishi Heavy Industries Technical Review Vol. 50 No. 3 (2013) Power Generation Technology Special Feature P18.
Non-patent Literature 2: Naito, "Reduction of Environmental Load of Heating Furnace with Ultra-low-NOx Burner" PETROTEC Vol. 31 No. 9 (2008).
Non-patent Literature 3: Watanabe, "Coal Combustion Technology for Thermal Power Generation" NAGARE 31 (2012) 339-344.

SUMMARY OF THE INVENTION

Problems to be Solved by the Invention

A first object of the present invention is to provide a catalyst and a method for removing NOx from a combustion exhaust gas. A second object of the present invention is to provide a catalyst and a method for removing NOx from a combustion exhaust gas, particularly a low-NOx combustion exhaust gas, in which SILICA is unlikely to be deposited and in which even when the amount of SILICA deposited is increased, denitration performance is hardly lowered.

Means for Solving the Problems

Researches for solving the above problems have resulted in completion of the present invention including the following aspects.

[1] A catalyst for removing NOx from a combustion exhaust gas, wherein the catalyst, in a pore volume distribution in a range of pore diameter of not more than $10^5$ Å, has a ratio of a pore volume in a range of pore diameter of not less than 500 Å and not more than 3000 Å relative to a total pore volume of not less than 15% and not more than 40%.

[2] The catalyst described in [1], wherein the catalyst, in the pore volume distribution in the range of pore diameter of not more than $10^5$ Å, has a ratio of a pore volume in a range of pore diameter of not less than 1000 Å relative to the total pore volume of not less than 10% and not more than 45%.

[3] The catalyst described in [1] or [2], comprising an oxide of titanium, an oxide of molybdenum and/or tungsten and an oxide of vanadium.

[4] The catalyst described in any one of [1] to [3], wherein the combustion exhaust gas is a low-NOx combustion exhaust gas.

[5] The catalyst described in any one of [1] to [4], wherein the catalyst, in the pore volume distribution in the range of pore diameter of not more than $10^5$ Å, has a ratio of a pore volume in a range of pore diameter of not less than 40 Å relative to the total pore volume of not less than 90%.

[6] A method comprising bringing a combustion exhaust gas into contact with the catalyst described in any one of [1] to [5] in the presence of ammonia to remove NOx from the combustion exhaust gas.

[7] The method described in [6], where the combustion exhaust gas is a low-NOx combustion exhaust gas.

The present invention includes the following preferred aspects.

[8] A catalyst for removing NOx from a combustion exhaust gas, wherein the catalyst has a ratio of a pore volume in a range of pore diameter of not less than 40 Å and not more than 3000 Å relative to a total pore volume of not less than 80% and a ratio of a pore volume in a range of pore diameter of not less than 500 Å and not more than 3000 Å relative to the total pore volume of not less than 15% and not more than 40% in a pore volume distribution in a range of pore diameter of not more than $10^5$ Å.

[9] A catalyst for removing NOx from a combustion exhaust gas, wherein the catalyst has a ratio of a pore volume in a range of pore diameter of not less than 3000 Å relative to a total pore volume of not more than 10%, a ratio of a pore volume in a range of pore diameter of not less than 500 Å relative to the total pore volume of not less than 25% and not more than 50% and a ratio of a pore volume in a range of pore diameter of not less than 40 Å relative to the total pore volume of not less than 90% in a pore volume distribution in a range of pore diameter of not more than $10^5$ Å.

[10] The catalyst described in [8] or [9], wherein the catalyst has a ratio of a pore volume in a range of pore diameter of not less than 1000 Å relative to the total pore volume of not less than 10% and not more than 45% in the pore volume distribution in the range of pore diameter of not more than $10^5$ Å.

[11] A method comprising bringing a combustion exhaust gas into contact with the catalyst described in any one of [8] to [10] in the presence of ammonia to remove NOx from the combustion exhaust gas.

[12] The method described in [11], wherein the combustion exhaust gas is a low-NOx combustion exhaust gas.

[13] The method described in [11], wherein the combustion exhaust gas has a NOx concentration of not more than 350 ppm.

Advantageous Effects of the Invention

The catalyst of the present invention is suitable for an ammonia catalytic reduction reaction for removing NOx from a combustion exhaust gas. In the catalyst of the present invention, SILICA is unlikely to be adhered and deposited on the surface of the catalyst, and even when SILICA is adhered and deposited, denitration performance is hardly lowered, with the result that the catalyst is highly resistant to the deposition of SILICA. The catalyst of the present invention is suitable for an ammonia catalytic reduction reaction for removing NOx from a low-NOx combustion exhaust gas.

According to the method of the present invention, even when SILICA is adhered and deposited on the surface of the catalyst, denitration performance is hardly lowered, and thus it is possible to reduce frequency with which the catalyst is replaced, with the result that it is possible to reduce costs related to purification of a combustion exhaust gas.

Since pore diameter of less than 500 Å is smaller than mean free path of gas, the gas easily collides with internal wall of the pore. Hence, it is considered that gaseous SILICA such as siloxanes reacts on the surface of catalyst pores to generate silica, SILICA is deposited, and the denitration performance of the catalyst whose pore diameters are small is lowered. On the other hand, a pore diameter of not less than 500 Å is close to or larger than mean free path of gas. It is considered that the collision of gaseous molecules within the pores is relatively lowered to reduce the deposition of SILICA, and that thus it is possible to inhibit a decrease in denitration performance.

EMBODIMENTS FOR CARRYING OUT THE INVENTION

Figure 1:
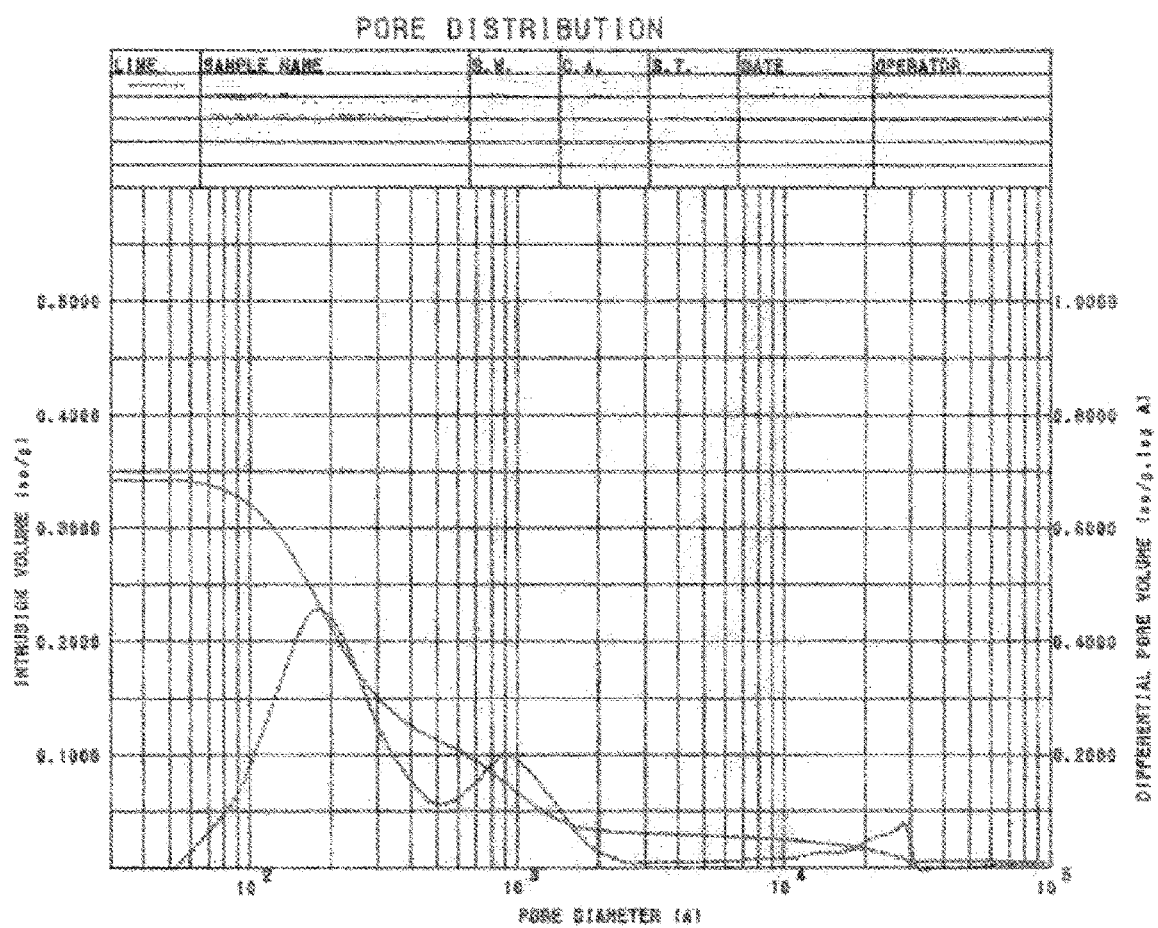
FIG. 1 is a diagram showing a pore volume distribution of a catalyst (honeycomb compact A) obtained in example 1.

The catalyst in the present invention is for removing NOx from a combustion exhaust gas.

The catalyst in the present invention has a pore volume distribution as described below.

In the catalyst in the present invention, in a pore volume distribution in a range of pore diameter of not more than $10^5$ Å, a ratio of a pore volume in a range of pore diameter of not less than 40 Å and not more than 3000 Å to a total pore volume is preferably not less than 80% and more preferably not less than 85%. The catalyst of the present invention preferably has almost no pores having a pore diameter of more than 3000 Å and less than 40 Å. Specifically, in the pore volume distribution in the range of pore diameter of not more than $10^5$ Å, a ratio of a pore volume in a range of pore diameter of not less than 3000 Å to the total pore volume is preferably not more than 10% and more preferably not more than 8%, and a ratio of a pore volume in a range of pore diameter of not less than 40 Å to the total pore volume is preferably not less than 90%, and more preferably not less than 93%.

In the catalyst in the present invention, in the pore volume distribution in the range of pore diameter of not more than $10^5$ Å, a ratio of a pore volume in a range of pore diameter of not less than 500 Å and not more than 3000 Å to the total pore volume is preferably not less than 15% and not more than 40%, and more preferably not less than 19% and not more than 39%. A ratio of a pore volume in a range of pore diameter of not less than 500 Å to the total pore volume is preferably not less than 25% and not more than 50%, more preferably not less than 26% and not more than 49% and further preferably not less than 23% and not more than 45%. Furthermore, a ratio of a pore volume in a range of pore diameter of not less than 1000 Å to the total pore volume is preferably not less than 10% and not more than 45%, more preferably not less than 11% and not more than 42% and further preferably not less than 7.5% and not more than 28%.

In the catalyst having the novel pore volume distribution as described above, SILICA is unlikely to be deposited on the surface of the catalyst, and even when SILICA is adhered and deposited, denitration performance is hardly lowered.

Additionally, the pore volume distribution in the present invention is obtained by measurements with a mercury injection method.

The catalyst in the present invention preferably comprises an oxide of titanium, an oxide of molybdenum and/or tungsten and an oxide of vanadium. Examples of the preferred form of the catalyst in the present invention can include $TiO_2$—$V_2O_5$—$WO_3$, $TiO_2$—$V_2O_5$—$MoO_3$, $TiO_2$—$V_2O_5$—$WO_3$—$MoO_3$ and the like.

A ratio of V element to Ti element, in terms of a weight percentage of $V_2O_5/TiO_2$, is preferably not more than 2% by weight, and more preferably not more than 1% by weight. A ratio of Mo element and/or W element to Ti element, in tams of a weight percentage of $(MoO_3+WO_3)/TiO_2$ when oxides of molybdenum and tungsten are used together is preferably not more than 10% by weight, and more preferably not more than 5% by weight.

In the preparation of the catalyst, as raw material of the oxide of titanium, used can be titanium oxide powder or a titanium oxide precursor. Examples of the titanium oxide precursor can include titanium oxide slurry, a titanium oxide sol, titanium sulfate, titanium tetrachloride, titanate and the like.

In the present invention, as raw material of the oxide of titanium, one forming into an anatase-type titanium oxide is preferably used.

As raw material of the oxide of vanadium, a vanadium compound such as vanadium pentoxide, ammonium metavanadate or vanadyl sulfate can be used.

As raw material of the oxide of tungsten, ammonium paratungstate, ammonium metatungstate, tungsten trioxide, tungsten chloride or the like can be used.

As raw material of the oxide of molybdenum, ammonium molybdate, molybdenum trioxide or the like can be used.

In the catalyst in the present invention, as a promoter component or an additive, an oxide of P, an oxide of S, an oxide of Al (for example, alumina), an oxide of Si (for example, glass fiber), an oxide of Zr (for example, zirconia), a gypsum (for example, dihydrate gypsum), zeolite or the like may be contained. These can be used in the form of powder, sol, slurry, fiber or the like when the catalyst is prepared.

In the catalyst in the present invention, there is no limitation to the shape thereof, and, for example, a shape such as a pellet shape, a spherical shape, a cylindrical shape, a honeycomb shape, a plate shape, a mesh shape or a corrugated shape can be adopted.

In the catalyst in the present invention, there is no particular limitation to a method for manufacturing it. The catalyst in the present invention can be manufactured using a method of controlling pore volume distribution which is known in the present technical field. For example, titanium oxide powder or a titanium oxide precursor is preliminarily calcined, then catalyst component such as V, W, Mo and the like and a promoter component or an additive as necessary are added, which are subjected to shape forming, and thereafter main calcining is performed, or alternatively, an organic polymer compound such as polyvinyl alcohol or polyethylene oxide and catalyst component such as V, W, Mo and the like, and a promoter component or an additive as necessary are added to titanium oxide powder or a titanium oxide precursor, which are subjected to shape foaming, and thereafter main calcining is performed, with the result that the catalyst of the present invention can be obtained.

The method in the present invention comprises bringing a combustion exhaust gas into contact with the catalyst of the present invention in the presence of ammonia to remove NOx from the combustion exhaust gas.

The combustion exhaust gas is preferably a low-NOx combustion exhaust gas and more preferably a combustion exhaust gas having a NOx concentration of not more than 350 ppm.

Ammonia can be added to the combustion exhaust gas according to a method known in the present technical field. The amount of ammonia is not particularly limited as long as the reduction reaction proceeds smoothly.

Bringing the combustion exhaust gas into contact with the catalyst of the present invention in the presence of ammonia can lead to, for example, a reduction reaction represented by formula (1) to convert a nitrogen oxide into nitrogen and water which are not toxic.

$$NO+NH_3+¼O_2 \rightarrow N_2+H_2O \qquad (1)$$

EXAMPLES

The present invention will be more specifically described based on examples and comparative examples below, but the present invention is not limited to the examples described below at all.

Example 1

Into a kneader, 820 kg of titanium dioxide was charged, a monoethanol aqueous solution in which 8.9 kg of ammonium metavanadate and 69.6 kg of ammonium paratungstate were dissolved was added, 46.7 kg of glass fiber, 46.7 kg of activated white earth and 9.3 kg of polyethylene oxide were added. And they were kneaded with the kneader. Thereafter, microcrystalline cellulose was added so as to be 15% by weight based on catalyst dry weight, and kneading was performed while regulating water content. Thereafter, the kneaded product was extruded with a screw-type vacuum extruder equipped with a honeycomb extrusion nozzle to obtain a honeycomb shaped product. The honeycomb shaped product was naturally dried and was then dried under ventilation at 100° C. for 5 hours. Thereafter, both ends in an axial direction were cut so as to be aligned, calcining was performed at 600° C. within an electric furnace to obtain a honeycomb compact A having outside diameters of 150 mm×150 mm, a length in the axial direction of 800 mm, a cell pitch of 7.4 mm, an internal wall thickness of 1.15 mm and a pore volume distribution shown in FIG. 1. A ratio of the pore volume in a range of pore diameter of not less than 40 Å and not more than 3000 Å to the total pore volume was not less than 80%, a ratio of the pore volume in a range of pore diameter of not less than 500 Å to the total pore volume was 33%, a ratio of the pore volume in a range of pore diameter of not less than 500 Å and not more than 3000 Å to the total pore volume was 24%, and a ratio of the pore volume in a range of pore diameter of not less than 1000 Å to the total pore volume was 19%.

Figure 4:
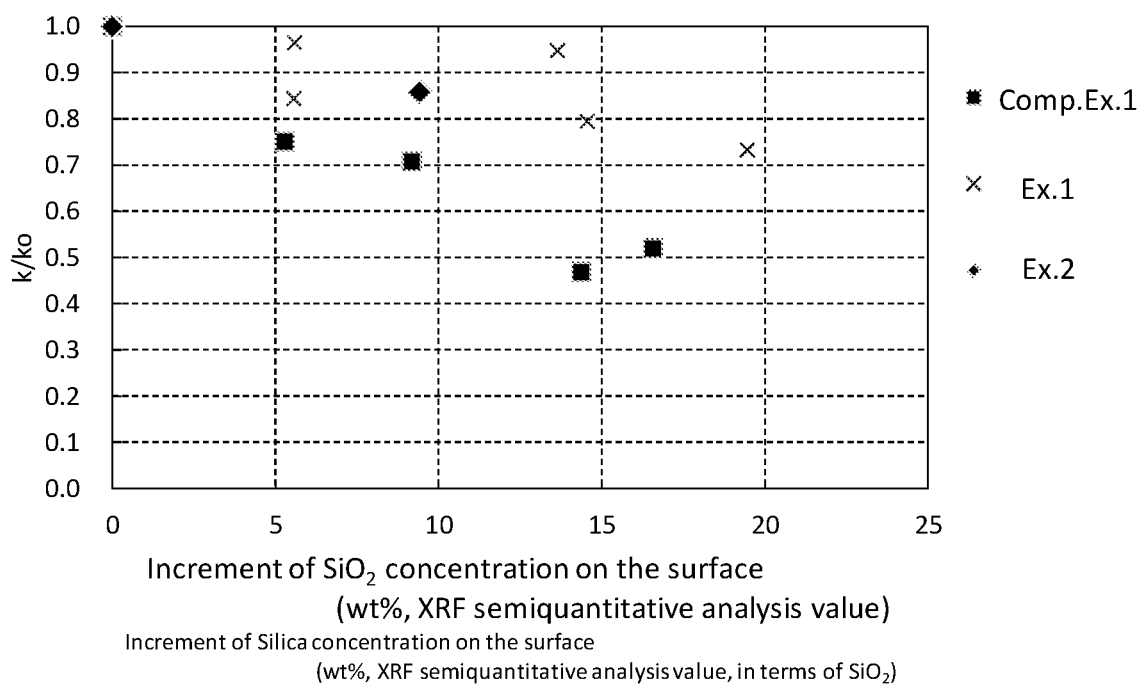
FIG. 4 is a diagram showing a relationship between the amount of SILICA deposited on the surface of the catalyst and a reaction rate constant ratio $k/k_0$.

The honeycomb compact A was placed in a denitration device of a low-NOx combustion boiler, and the removal of NOx from a combustion exhaust gas (concentration of NOx was 200 ppm) was performed for 56 thousand hours. An amount of SILICA deposited on the surface of the catalyst and a denitration ratio were measured. A relationship (indicated by x) between the amount of SILICA deposited on the surface of the catalyst and a reaction rate constant ratio $k/k_0$ is shown in FIG. 4.

Example 2

Figure 2:
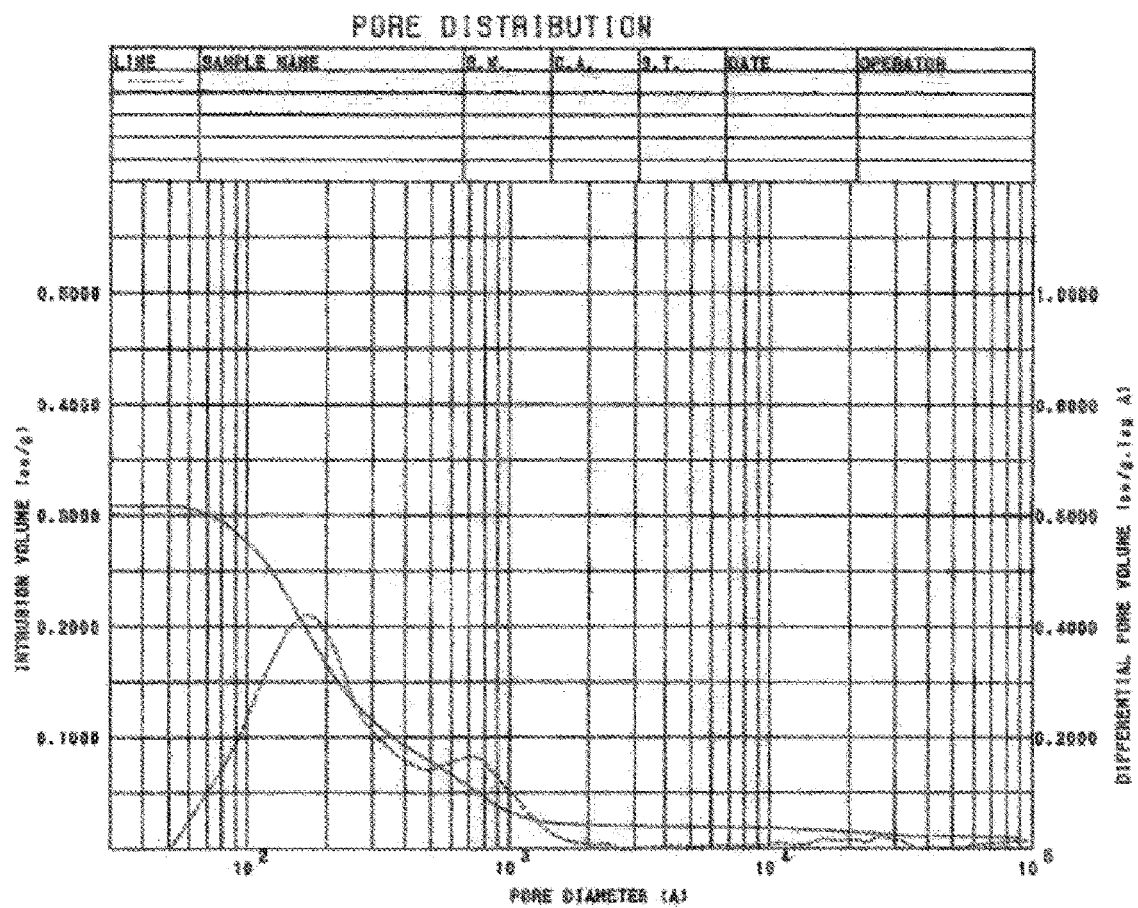
FIG. 2 is a diagram showing a pore volume distribution of a catalyst (honeycomb compact B) obtained in example 2.

A honeycomb compact B was obtained in the same manner as in example 1 except that the amount of microcrystalline cellulose was changed to 10% by weight based on catalyst dry weight. The honeycomb compact B had outside diameters of 150 mm×150 mm, a length in the axial direction of 800 mm, a cell pitch of 7.4 mm, an internal wall thickness of 1.15 mm and a pore volume distribution shown in FIG. 2. A ratio of the pore volume in a range of pore diameter of not less than 40 Å and not more than 3000 Å to the total pore volume was not less than 80%, a ratio of the pore volume in a range of pore diameter of not less than 500 Å to the total pore volume was 26%, a ratio of the pore volume in a range of pore diameter of not less than 500 Å and not more than 3000 Å to the total pore volume was 18% and a ratio of the pore volume in a range of pore diameter of not less than 1000 Å to the total pore volume was 11%.

The honeycomb compact B was placed in the denitration device of the low-NOx combustion boiler, and the removal of NOx from a combustion exhaust gas (concentration of NOx was 350 ppm) was performed for 15 thousand hours. An amount of SILICA deposited on the surface of the catalyst and a denitration ratio were measured. A relationship (indicated by ♦) between the amount of SILICA deposited on the surface of the catalyst and the reaction rate constant ratio $k/k_0$ is shown in FIG. 4.

Comparative Example 3

Figure 3:
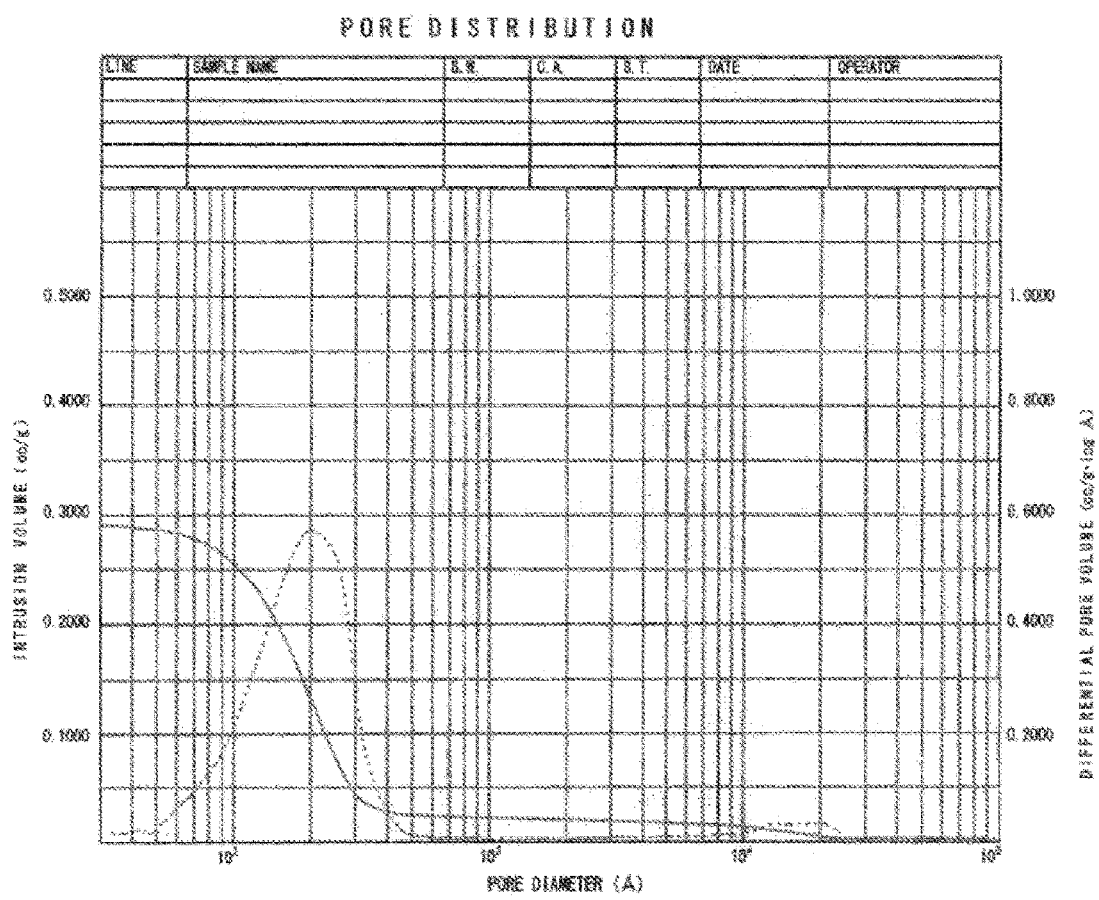
FIG. 3 is a diagram showing a pore volume distribution of a catalyst (honeycomb compact C) obtained in comparative example 1.

A honeycomb compact C was obtained in the same manner as in example 1 except that the amount of microcrystalline cellulose was changed to 0% by weight based on catalyst dry weight. The honeycomb compact C had outside diameters of 150 mm×150 mm, a length in the axial direction of 800 mm, a cell pitch of 7.4 mm, an internal wall thickness of 1.15 mm and a pore volume distribution shown in FIG. 3. A ratio of the pore volume in a range of pore diameter of not less than 500 Å to the total pore volume was 9%, a ratio of the pore volume in a range of pore diameter of not less than 500 Å and not more than 3000 Å to the total pore volume was 4%, and a ratio of the pore volume in a range of pore diameter of not less than 1000 Å to the total pore volume was 7%.

The honeycomb compact C was placed in the denitration device of the low-NOx combustion boiler, and the removal of NOx from a combustion exhaust gas (concentration of NOx was 270 ppm) was performed for 30 thousand hours. An amount of SILICA deposited on the surface of the catalyst and a denitration ratio were measured. A relationship (indicated by ■) between the amount of SILICA deposited on the surface of the catalyst and the reaction rate constant ratio $k/k_0$ is shown in FIG. 4.

As described above, with the catalyst of the present invention, it is possible to remove NOx from a combustion exhaust gas, preferably a low-NOx combustion exhaust gas, and denitration performance is hardly lowered even when the amount of SILICA deposited on the surface of the catalyst is increased.

Furthermore, SILICA processing was performed for a certain period of time in a laboratory experiment, and the reaction rate constant ratio $k/k_0$ was measured.

Example 3

Figure 5:
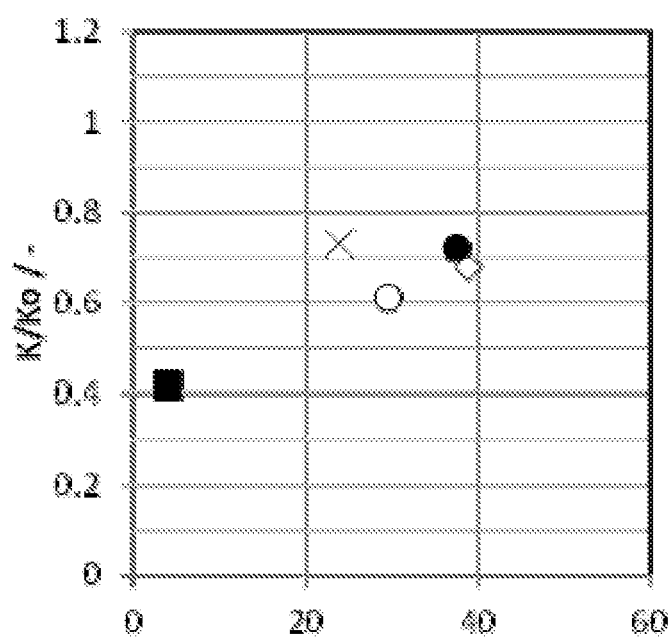
FIG. 5 is a diagram showing a relationship between the ratio of a pore volume in a range of pore diameter of not less than 500 Å and not more than 3000 Å the total pore volume and the reaction rate constant ratio $k/k_0$.
Figure 6:
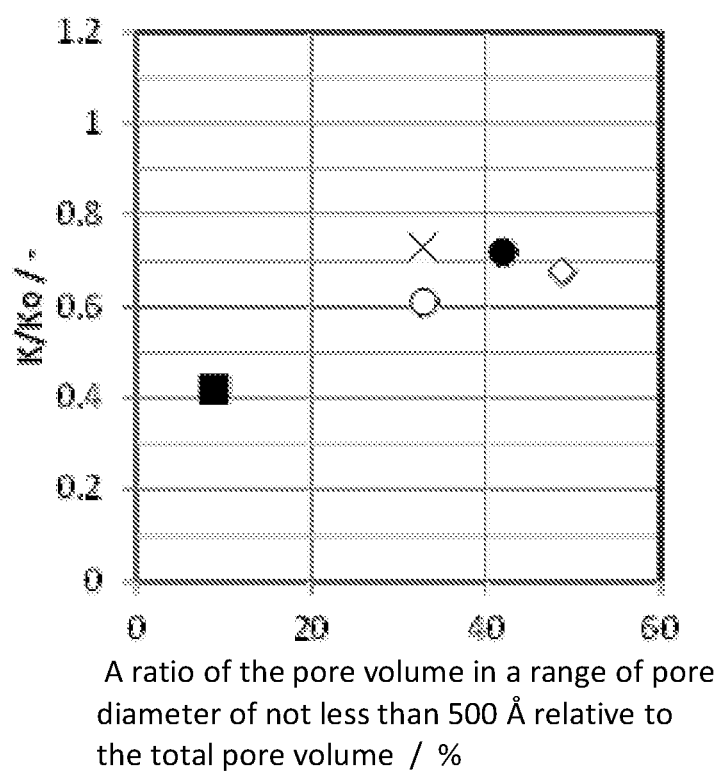
FIG. 6 is a diagram showing a relationship between the ratio of a pore volume in a range of pore diameter of not less than 500 Å to the total pore volume and the reaction rate constant ratio $k/k_0$.

The honeycomb compact A was exposed to a simulant exhaust gas containing siloxane in a laboratory. Thereafter, a denitration ratio was measured. A relationship (indicated by x) between the ratio of the pore volume in a range of pore diameter of not less than 500 Å and not more than 3000 Å to the total pore volume and the reaction rate constant ratio $k/k_0$ is shown in FIG. 5. A relationship (indicated by x) between the ratio of the pore volume in a range of pore diameter of not less than 500 Å to the total pore volume and the reaction rate constant ratio $k/k_0$ is shown in FIG. 6.

Example 4

Figure 7:
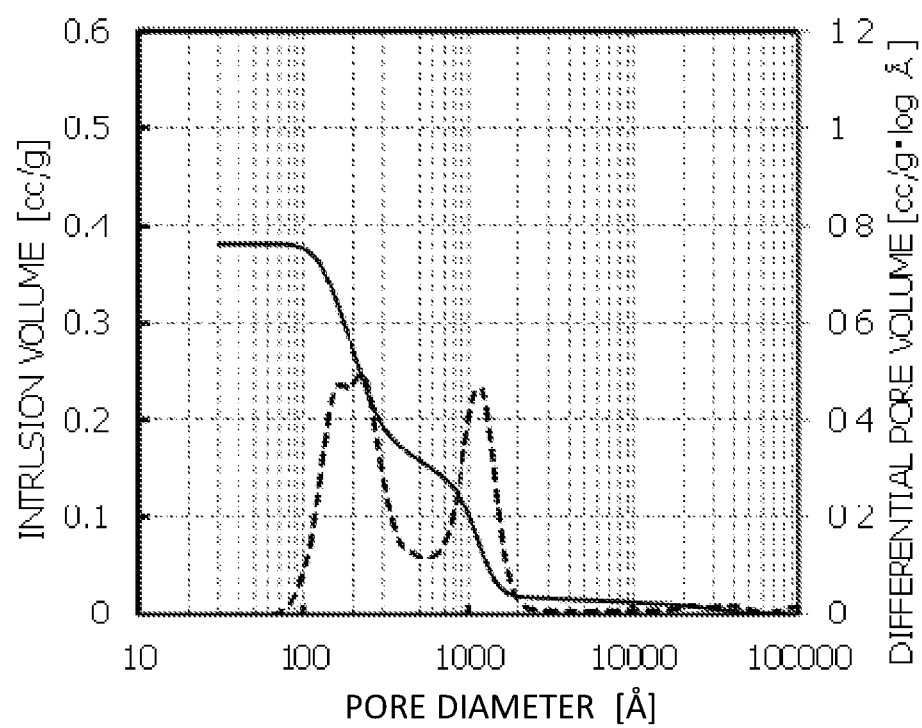
FIG. 7 is a diagram showing a pore volume distribution of a catalyst (honeycomb compact D) obtained in example 4.

A honeycomb compact D was obtained in the same manner as in example 1 except that the amount of microcrystalline cellulose was changed to 18% by weight based on catalyst dry weight. The honeycomb compact D had outside diameters of 150 mm×150 mm, a length in the axial direction of 800 mm, a cell pitch of 7.4 mm, an internal wall thickness of 1.15 mm and a pore volume distribution shown in FIG. 7. A ratio of the pore volume in a range of pore diameter of not less than 40 Å and not more than 3000 Å to the total pore volume was not less than 80%, a ratio of the pore volume in a range of pore diameter of not less than 500 Å to the total pore volume was 42%, a ratio of the pore volume in a range of pore diameter of not less than 500 Å and not more than 3000 Å to the total pore volume was 38%, and a ratio of the pore volume in a range of pore diameter of not less than 1000 Å to the total pore volume was 27%.

The honeycomb compact D was exposed to the simulant exhaust gas containing siloxane in the laboratory. Thereafter, a denitration ratio was measured. A relationship (indicated by ●) between the ratio of the pore volume in a range of pore diameter of not less than 500 Å and not more than 3000 Å to the total pore volume and the reaction rate constant ratio $k/k_0$ is shown in FIG. 5. A relationship (indicated by ●) between the ratio of the pore volume in a range of pore diameter of not less than 500 Å to the total pore volume and the reaction rate constant ratio $k/k_0$ is shown in FIG. 6.

Example 5

Figure 8:
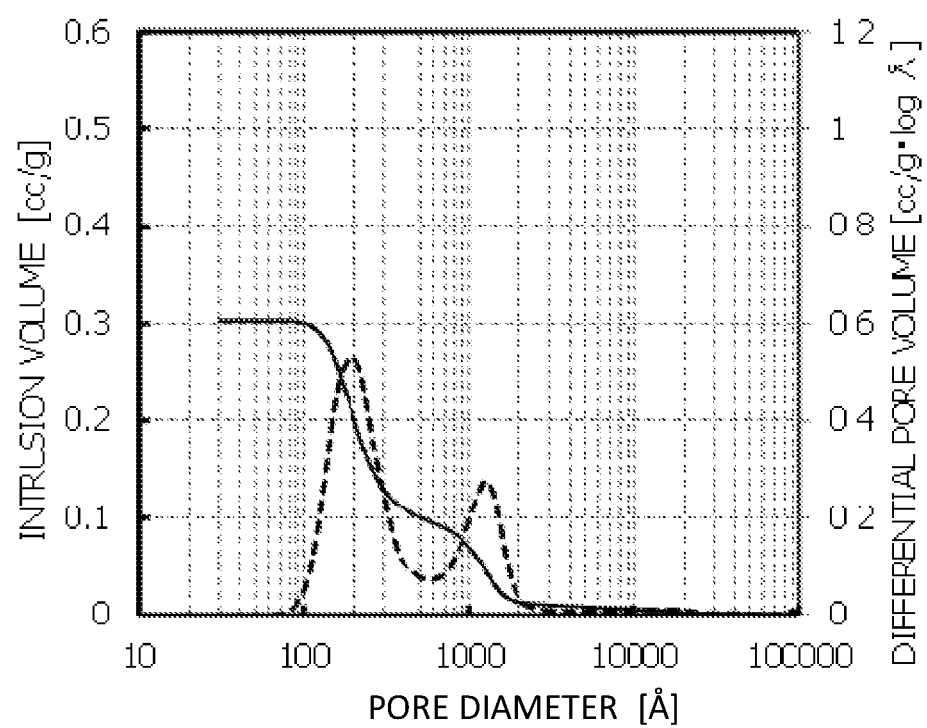
FIG. 8 is a diagram showing a pore volume distribution of a catalyst (honeycomb compact E) obtained in example 5.

A honeycomb compact E was obtained in the same manner as in example 1 except that the amount of microcrystalline cellulose was changed to 16% by weight based on catalyst dry weight. The honeycomb compact E had outside diameters of 150 mm×150 mm, a length in the axial direction of 800 mm, a cell pitch of 7.4 mm, an internal wall thickness of 1.15 mm and a pore volume distribution shown in FIG. 8. A ratio of the pore volume in a range of pore diameter of not less than 40 Å and not more than 3000 Å to the total pore volume was not less than 80%, a ratio of the pore volume in a range of pore diameter of not less than 500

Å to the total pore volume was 33%, a ratio of the pore volume in a range of pore diameter of not less than 500 Å and not more than 3000 Å to the total pore volume was 30% and a ratio of the pore volume in a range of pore diameter of not less than 1000 Å to the total pore volume was 23%.

The honeycomb compact E was exposed to the simulant exhaust gas containing siloxane in the laboratory. Thereafter, a denitration ratio was measured. A relationship (indicated by ○) between the ratio of the pore volume in a range of pore diameter of not less than 500 Å and not more than 3000 Å to the total pore volume and the reaction rate constant ratio $k/k_0$ is shown in FIG. 5. A relationship (indicated by ○) between the ratio of the pore volume in a range of pore diameter of not less than 500 Å to the total pore volume and the reaction rate constant ratio $k/k_0$ is shown in FIG. 6.

Example 6

Figure 9:
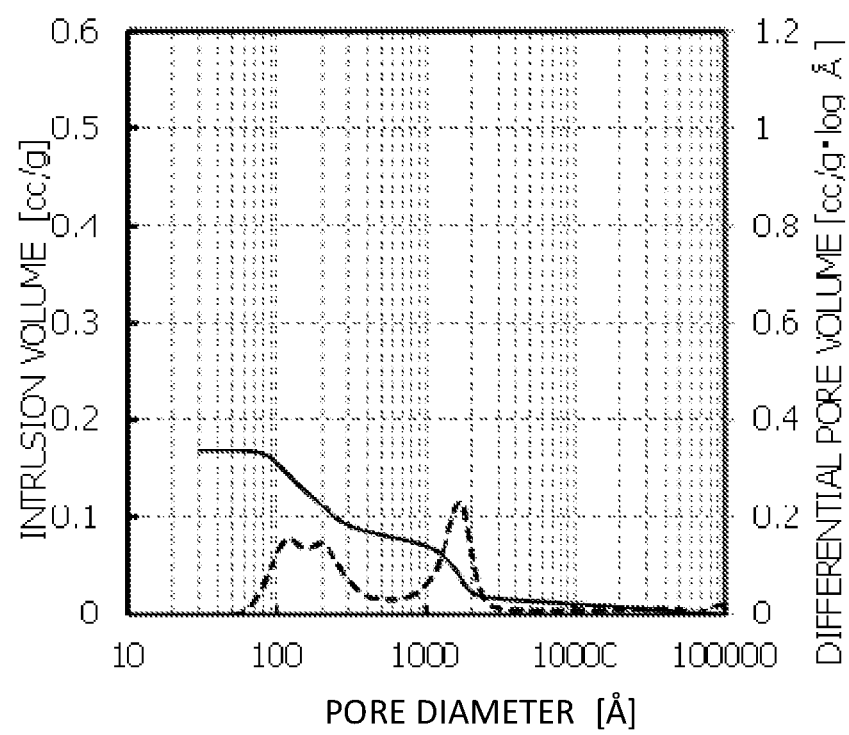
FIG. 9 is a diagram showing a pore volume distribution of a catalyst (honeycomb compact F) obtained in example 6.

A honeycomb compact F was obtained in the same manner as in example 1 except that the amount of microcrystalline cellulose was changed to 20% by weight based on catalyst dry weight. The honeycomb compact F had outside diameters of 150 mm×150 mm, a length in the axial direction of 800 mm, a cell pitch of 7.4 mm, an internal wall thickness of 1.15 mm and a pore volume distribution shown in FIG. 9. A ratio of the pore volume in a range of pore diameter of not less than 40 Å and not more than 3000 Å to the total pore volume was not less than 80%, a ratio of the pore volume in a range of pore diameter was not less than 500 Å to the total pore volume was 49%, a ratio of the pore volume in a range of pore diameter of not less than 500 Å and not more than 3000 Å to the total pore volume was 39% and a ratio of the pore volume in a range of pore diameter of not less than 1000 Å to the total pore volume was 42%.

The honeycomb compact F was exposed to the simulant exhaust gas containing siloxane in the laboratory. Thereafter, a denitration ratio was measured. A relationship (indicated by ◇) between the ratio of the pore volume in a range of pore diameter of not less than 500 Å and not more than 3000 Å to the total pore volume and the reaction rate constant ratio $k/k_0$ is shown in FIG. 5. A relationship (indicated by ◇) between the ratio of the pore volume in a range of pore diameter of not less than 500 Å to the total pore volume and the reaction rate constant ratio $k/k_0$ is shown in FIG. 6.

Comparative Example 2

The honeycomb compact C was exposed to the simulant exhaust gas containing siloxane in the laboratory. Thereafter, an amount of SILICA deposited on the surface of the catalyst and a denitration ratio were measured. A relationship (indicated by ■) between the ratio of the pore volume in a range of pore diameter of not less than 500 Å and not more than 3000 Å to the total pore volume and the reaction rate constant ratio $k/k_0$ is shown in FIG. 5. A relationship (indicated by ■) between the ratio of the pore volume in a range of pore diameter of not less than 500 Å to the total pore volume and the reaction rate constant ratio $k/k_0$ is shown in FIG. 6.

The invention claimed is:

1. A catalyst for removing NOx from a combustion exhaust gas, wherein the catalyst comprises an oxide of titanium, an oxide of molybdenum and/or tungsten, and an oxide of vanadium, wherein a ratio of V element to Ti element is not more than 2% by weight in terms of a weight percentage of $V_2O_5/TiO_2$, the catalyst has a ratio of a pore volume in a range of pore diameter of not less than 500 Å and not more than 3000 Å relative to a total pore volume of not less than 15% and not more than 40%, a ratio of a pore volume in a range of pore diameter of not less than 500 Å relative to the total pore volume of not less than 25% and not more than 50% and a ratio of a pore volume in a range of pore diameter of not less than 1000 Å relative to the total pore volume of not less than 10% and not more than 45% in a pore volume distribution in a range of pore diameter of not more than $10^5$ Å.

2. The catalyst according to claim 1, wherein the catalyst has a ratio of a pore volume in a range of pore diameter of not less than 40 Å and not more than 3000 Å relative to the total pore volume of not less than 80% in the pore volume distribution in the range of pore diameter of not more than $10^5$ Å.

3. The catalyst according to claim 2, wherein the catalyst has a ratio of a pore volume in a range of pore diameter of not less than 40 Å relative to the total pore volume of not less than 90% in the pore volume distribution in the range of pore diameter of not more than $10^5$ Å.

4. The catalyst according to claim 2, wherein a ratio of Mo element and/or W element to Ti element is not more than 5% by weight in terms of a weight percentage of $(MoO_3+WO_3)/TiO_2$.

5. The catalyst according to claim 2, wherein the catalyst has a ratio of a pore volume in a range of pore diameter of not less than 3000 Å relative to the total pore volume of not more than 10% in the pore volume distribution in the range of pore diameter of not more than $10^5$ Å.

6. The catalyst according to claim 1, wherein the catalyst has a ratio of a pore volume in a range of pore diameter of not less than 40 Å relative to the total pore volume of not less than 90% in the pore volume distribution in the range of pore diameter of not more than $10^5$ Å.

7. The catalyst according to claim 6, wherein a ratio of Mo element and/or W element to Ti element is not more than 5% by weight in terms of a weight percentage of $(MoO_3+WO_3)/TiO_2$.

8. The catalyst according to claim 6, wherein the catalyst has a ratio of a pore volume in a range of pore diameter of not less than 3000 Å relative to the total pore volume of not more than 10% in the pore volume distribution in the range of pore diameter of not more than $10^5$ Å.

9. The catalyst according to claim 1, wherein a ratio of Mo element and/or W element to Ti element is not more than 5% by weight in terms of a weight percentage of $(MoO_3+WO_3)/TiO_2$.

10. The catalyst according to claim 1, wherein the catalyst has a ratio of a pore volume in a range of pore diameter of not less than 3000 Å relative to the total pore volume of not more than 10% in the pore volume distribution in the range of pore diameter of not more than $10^5$ Å.

11. A method comprising bringing a combustion exhaust gas into contact with the catalyst according to claim 1, in the presence of ammonia to remove NOx from the combustion exhaust gas.

12. The method according to claim 11, wherein the combustion exhaust gas is a low concentration-NOx combustion exhaust gas.

13. The method according to claim 12, wherein the combustion exhaust gas has a NOx concentration of not more than 350 ppm.

* * * * *